(12) United States Patent
Malkowski

(10) Patent No.: US 10,767,361 B2
(45) Date of Patent: Sep. 8, 2020

(54) EMERGENCY ESCAPE TUNNEL

(71) Applicant: FIMARC Bezpieczenstwo i Ochrona Przeciwpozarowa Biuro Ekspertyz, Doradztwa i Nadzoru, Wiry (PL)

(72) Inventor: Zenon Malkowski, Wiry (PL)

(73) Assignee: FIMARC BEZPIECZENSTWO I OCHRONA PRZECIWPOZAROWA BIURO EKSPERTYZ, DORADZTWA I NADZORU, Wiry (PL)

( * ) Notice: Subject to any disclaimer, the term of this patent is extended or adjusted under 35 U.S.C. 154(b) by 123 days.

(21) Appl. No.: 16/080,447

(22) PCT Filed: Feb. 13, 2017

(86) PCT No.: PCT/PL2017/000008
§ 371 (c)(1),
(2) Date: Aug. 28, 2018

(87) PCT Pub. No.: WO2017/150994
PCT Pub. Date: Sep. 8, 2017

(65) Prior Publication Data
US 2019/0063058 A1 Feb. 28, 2019

(30) Foreign Application Priority Data

Feb. 29, 2016 (PL) .......................................... 416308

(51) Int. Cl.
*E04B 1/343* (2006.01)
*E04B 1/94* (2006.01)
(Continued)

(52) U.S. Cl.
CPC ............ *E04B 1/34305* (2013.01); *A62B 3/00* (2013.01); *E04B 1/94* (2013.01); *A62B 5/00* (2013.01); *B64F 1/305* (2013.01); *E04B 1/3431* (2013.01)

(58) Field of Classification Search
CPC ........ E04B 1/34305; E04B 1/94; E04B 1/305; E04B 1/3441; A62B 3/00; A62B 5/00
See application file for complete search history.

(56) References Cited

U.S. PATENT DOCUMENTS

| | | | | |
|---|---|---|---|---|
| 1,456,478 A | * | 5/1923 | White | E04B 1/34305 52/67 |
| 3,131,705 A | * | 5/1964 | Marino | E04H 15/04 135/131 |

(Continued)

FOREIGN PATENT DOCUMENTS

| | | |
|---|---|---|
| DE | 20201975 U1 | 6/2003 |
| DE | 10201723 A1 | 7/2003 |

(Continued)

OTHER PUBLICATIONS http://translationportal.epo.org/emtp/translate/?ACTION=description-retrieval&COUNTRY=DE&ENGINE=google&FORMAT=docdb&KIND=A1&LOCALE=en_EP&NUMBER=10201723&OPS=ops.epo.org/3.2&SRCLANG=de&TRGLANG=en DE10201723 (Year: 2019).*

(Continued)

*Primary Examiner* — Katherine W Mitchell
*Assistant Examiner* — Candace L Bradford
(74) *Attorney, Agent, or Firm* — Katten Muchin Rosenman LLP

(57) ABSTRACT

The object of the invention is an emergency escape tunnel in a multi-storey building, especially in a building with a centrally situated staircase and useable rooms surrounding it, used to evacuate people in case of a fire hazard. The (Continued)

Figure 1:
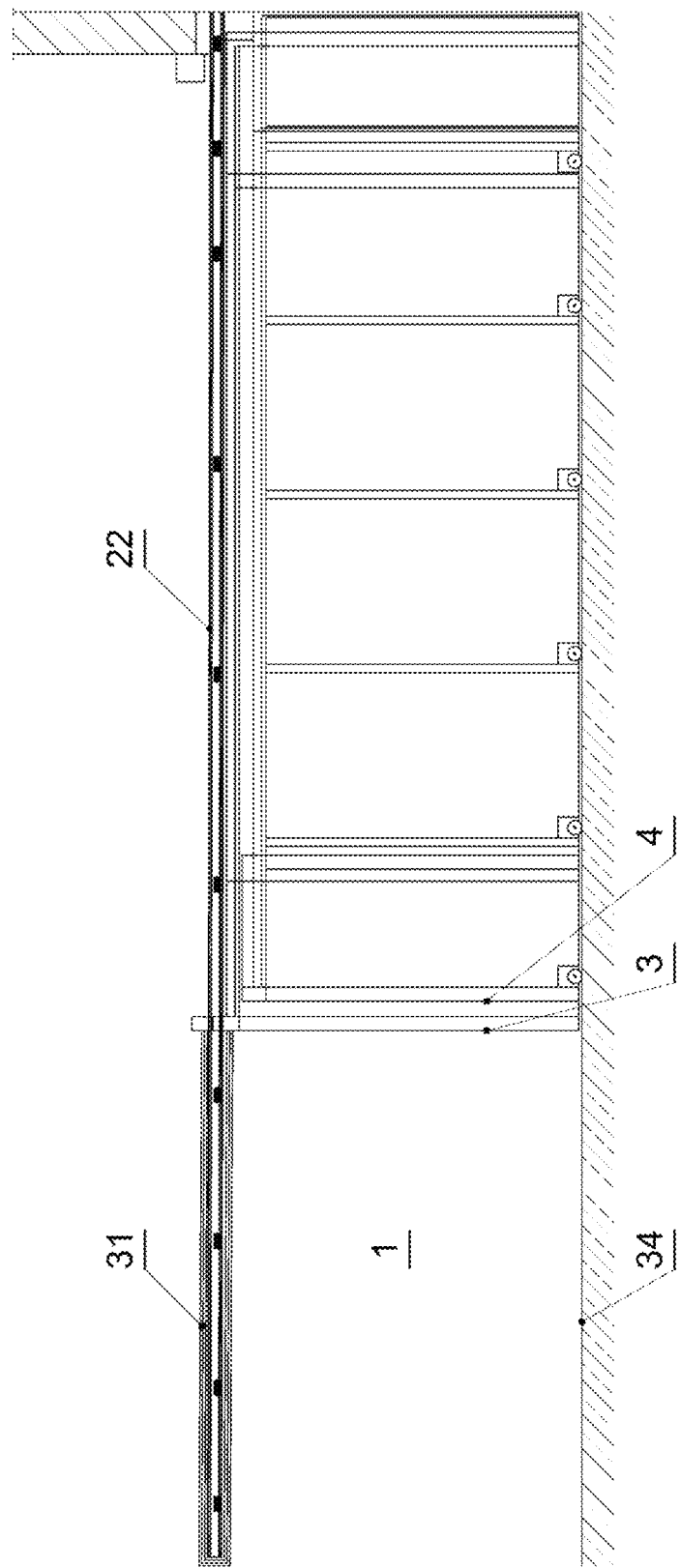

emergency escape tunnel according to the invention is equipped with a load-bearing skeleton (6) with an outline similar in shape to an upturned letter U, its surface wall (7) and side walls (8) being covered with layers of a fire-resistant material. The tunnel has a self-activating drive system (13, 32, 36) and is horizontally shiftable in the space (14) between the staircase (1) and the external wall (2) of the building. In the resting position, the tunnel is situated within the staircase and in the operating position the outlet section (15) of the tunnel is situated within the exit door (16) of the building whereas its exit opening (17)| is situated beyond the building. To make it possible to use the tunnel in relatively vast spaces of the building, it consists of two or three telescopically overlapping segments (3, 3a, 4), the ends of which are mutually interlocked with their cover flanges (5).

9 Claims, 12 Drawing Sheets

(51) Int. Cl.
    *A62B 3/00*     (2006.01)
    *B64F 1/305*     (2006.01)
    *A62B 5/00*     (2006.01)

(56) References Cited

U.S. PATENT DOCUMENTS

| | | | | |
|---|---|---|---|---|
| 3,833,954 | A * | 9/1974 | Daughenbaugh | B62D 63/061 |
| | | | | 296/171 |
| 5,595,203 | A * | 1/1997 | Espinosa | E04H 15/36 |
| | | | | 135/123 |
| 9,187,892 | B1 * | 11/2015 | Orr | E04H 1/005 |
| 9,616,261 | B1 * | 4/2017 | Rambert | F41H 5/14 |
| 2013/0326975 | A1 * | 12/2013 | Stenseide | E04B 1/24 |
| | | | | 52/232 |
| 2014/0123570 | A1 * | 5/2014 | Nam | A62B 3/00 |
| | | | | 52/67 |
| 2015/0218833 | A1 * | 8/2015 | Ballantyne | E04B 1/34384 |
| | | | | 52/79.1 |

FOREIGN PATENT DOCUMENTS

| | | | | |
|---|---|---|---|---|
| DE | 202005019255 U1 | 2/2006 | | |
| KR | 101046271 B1 | 7/2011 | | |
| WO | 2013/081538 A1 | 6/2013 | | |
| WO | 2016/024031 A1 | 2/2016 | | |
| WO | WO-2017150994 A1 * | 9/2017 | | E04B 1/34305 |

OTHER PUBLICATIONS http://translationportal.epo.org/emtp/translate/?ACTION=description-retrieval&COUNTRY=DE&ENGINE=google&FORMAT=docdb&KIND=U1&LOCALE=en_EP&NUMBER=202005019255&OPS=ops.epo.org/3.2&SRCLANG=de&TRGLANG=en DE202005019255 (Year: 2019).*

International Search Report and Written Opinion dated Apr. 6, 2017, from International Application No. PCT/PL2017/000008, 10 sheets.

* cited by examiner

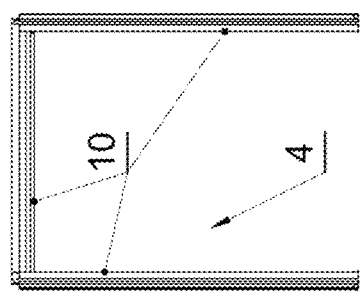
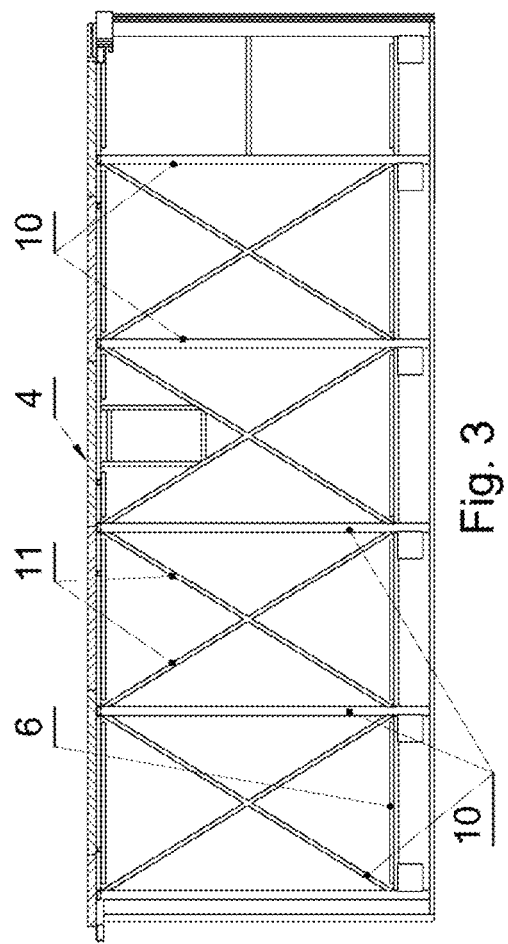
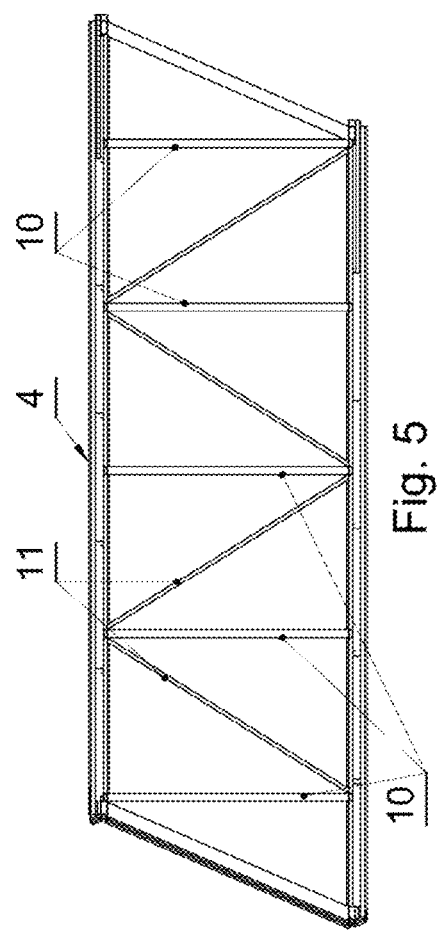

EMERGENCY ESCAPE TUNNEL

The object of the invention is an escape tunnel in a multi-storey building with a centrally situated staircase and useable rooms surrounding it, used to evacuate people in case of fire hazard.

From the description of a German utility model DE 20 2005 019 255 U1 there is known a self-supporting structure of a fixed emergency escape tunnel designed for installation in already existing buildings where it is necessary to provide additional emergency escape routes. In order to limit the loads of the building, the known tunnel with an outline of an upturned letter U has a rectangular skeleton of steel section bars which is anchored to the substrate by means of inclined corner supports. The surface wall and the side walls of the tunnel are formed by plates of sheet steel which are externally covered with layers of a fire-resistant material. Furthermore, there are known emergency escape corridors or tunnels being integral and fixed elements of buildings with a centrally situated staircase and useable rooms surrounding it. There are commonly known shiftable communication tunnels, colloquially called jet bridges, which are used at airports for transferring passengers between airport buildings and airplanes and in the opposite direction. These tunnels are provided on mobile chassis units, have a skeleton type structure and are built of telescopically and also articulately interconnected segments with cuboidal outlines. Chassis units of airport tunnels are equipped with drives which enable them to move freely on the airport apron.

Escape tunnel in a multi-storey building with a centrally situated staircase, which tunnel is formed of at least two telescopically overlapping segments, each of which is equipped with a load-bearing skeleton with an outline similar in shape to an upturned letter U, its wherein the top wall and side walls of the skeleton being covered from the outside with layers of a fire-resistant material, characterised according to the invention in that it has a self-acting drive system and it is horizontally shiftable in the space between the staircase and the external wall of the building, the tunnel being located in the resting position inside the staircase, and in its operating position its outlet piece being situated within the open exit door of the building while the exit of the tunnel being situated on the outside of the building. To make it possible to use the tunnel in relatively vast spaces, it consists of two or three telescopically overlapping segments. When the tunnel consists of two segments, the ends of which are interlocked with their retaining flanges. Similarly, in the case where the tunnel consists of three segments, the ends of the adjacent segments are interlocked with their retaining flanges. The load-bearing skeleton of each segment is built of spaced lateral frames with an outline similar in shape to an upturned letter U, the adjacent segment frames being permanently interconnected by means of slanted strut and traction wheels being provided on the lower edges of the skeleton. Over the segments of the tunnel there are horizontally spread two parallel and longitudinally sliding rails. Each of the rails consists of a C-profile guide and a drive toothed bar inseparably connected to it. The front ends of the sliding rails are mounted to the front edge of the internal segment of the tunnel. Inside the C-profile guide there are provided fixed roller supports which are fastened to the walls of the staircase. The toothed bars of the sliding rails mesh with the toothed wheels of the drive system which is situated within the staircase. Considering the possibility of an undesired contact with fire, the rear sections of the sliding rails are surrounded by tubular shields made of a fire-resistant material and mounted on fixed roller supports. The drive system of the tunnel can have a form of a flexible drive cable without an end which is immersed in a channel formed in the floor of the building and spread parallel to the sliding rails with the C-profile guide the upper section of the drive cable being connected pointwise to the front edge of the internal segment of the tunnel by means of a transversal hook. Preferably, the drive cable has a form of driving chain and the cross-section of the channel is narrowed upwards. In yet another embodiment, the drive system is a set of individual drives which are coupled to the traction wheels of the internal tunnel segment.

Thanks to the solution according to the invention, the escape tunnel in its resting position is entirely hidden inside the staircase and therefore it does not block the space separating the staircase from the external walls of the building.

Figure 2:
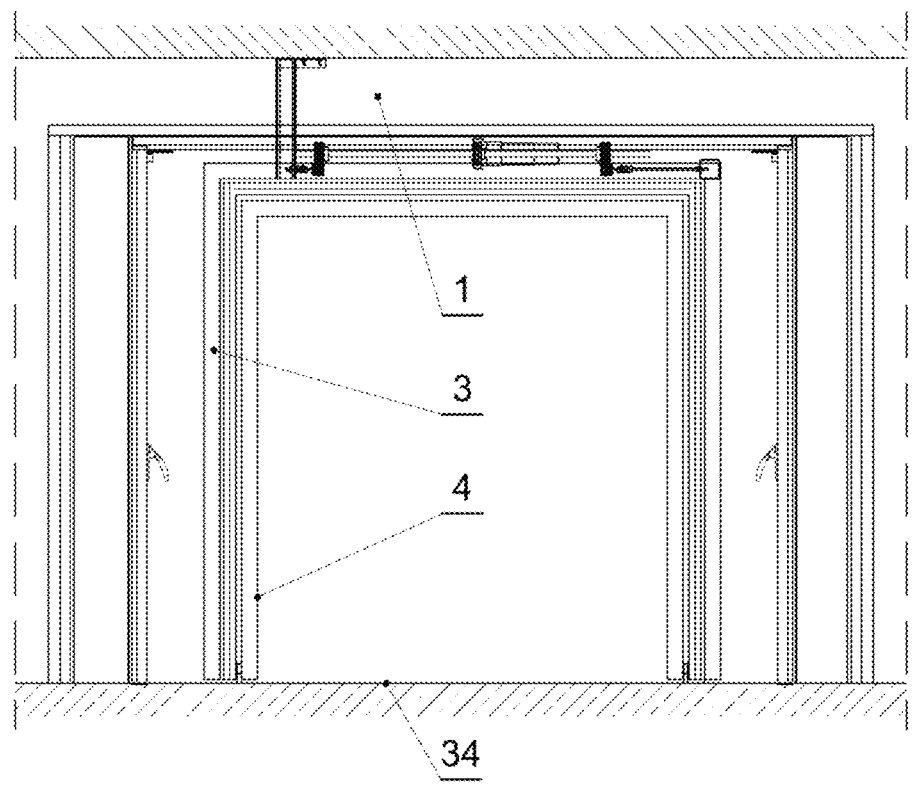
Figure 7:
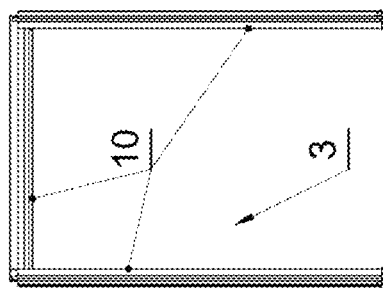
Figure 6:
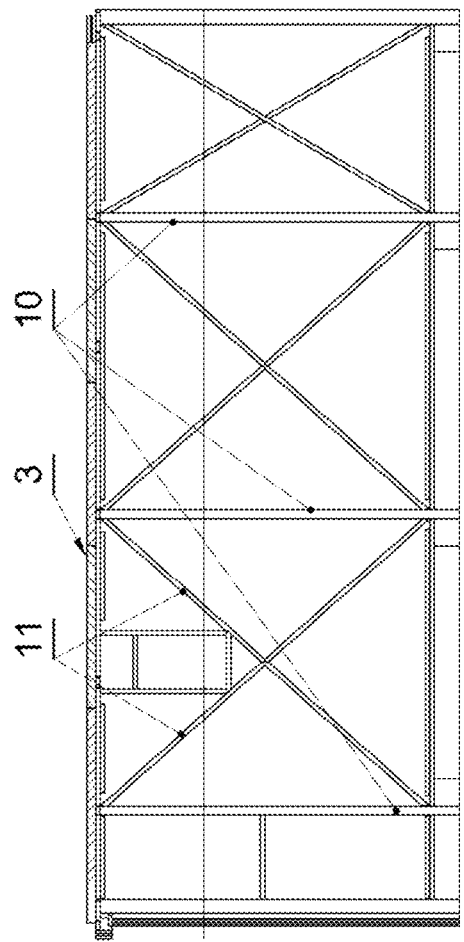
Figure 8:
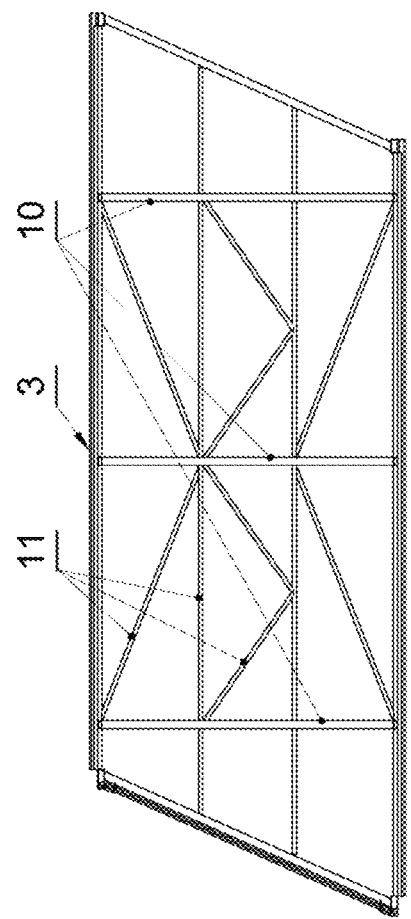
Figure 9:
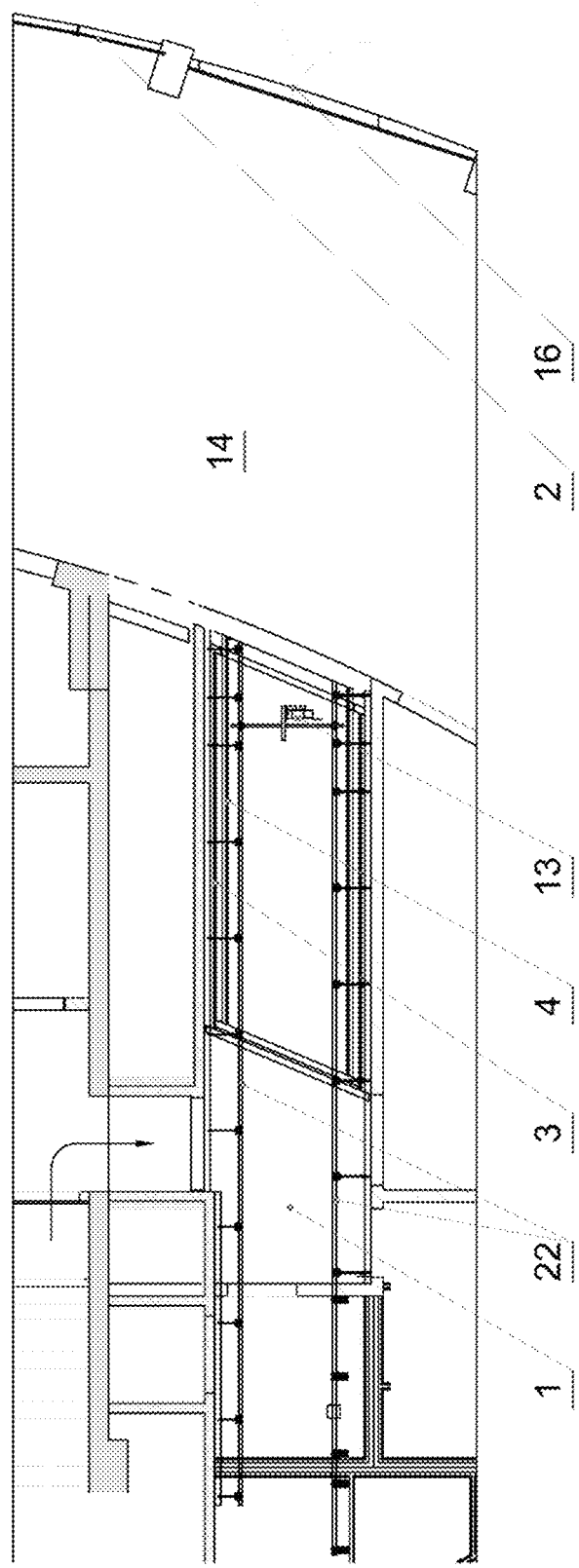
Figure 10:
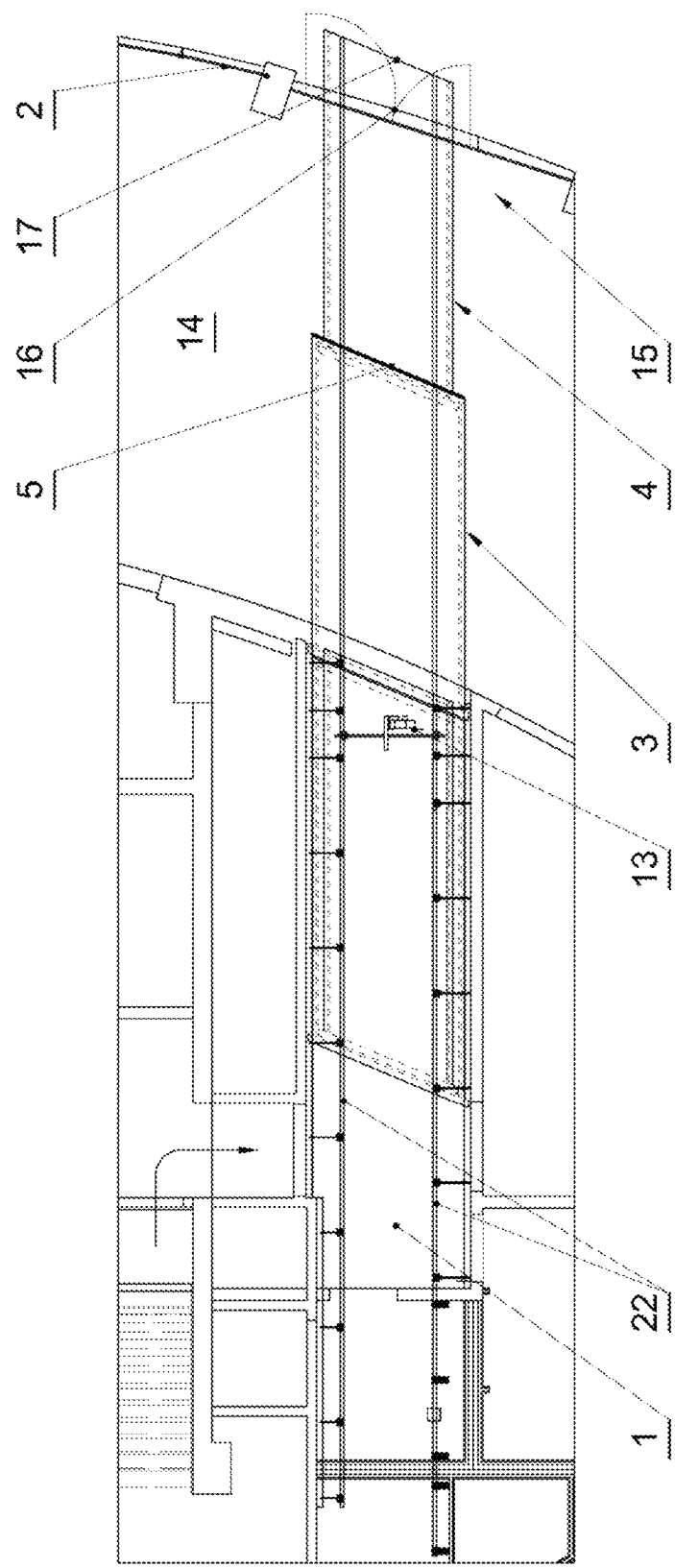
Figure 11:
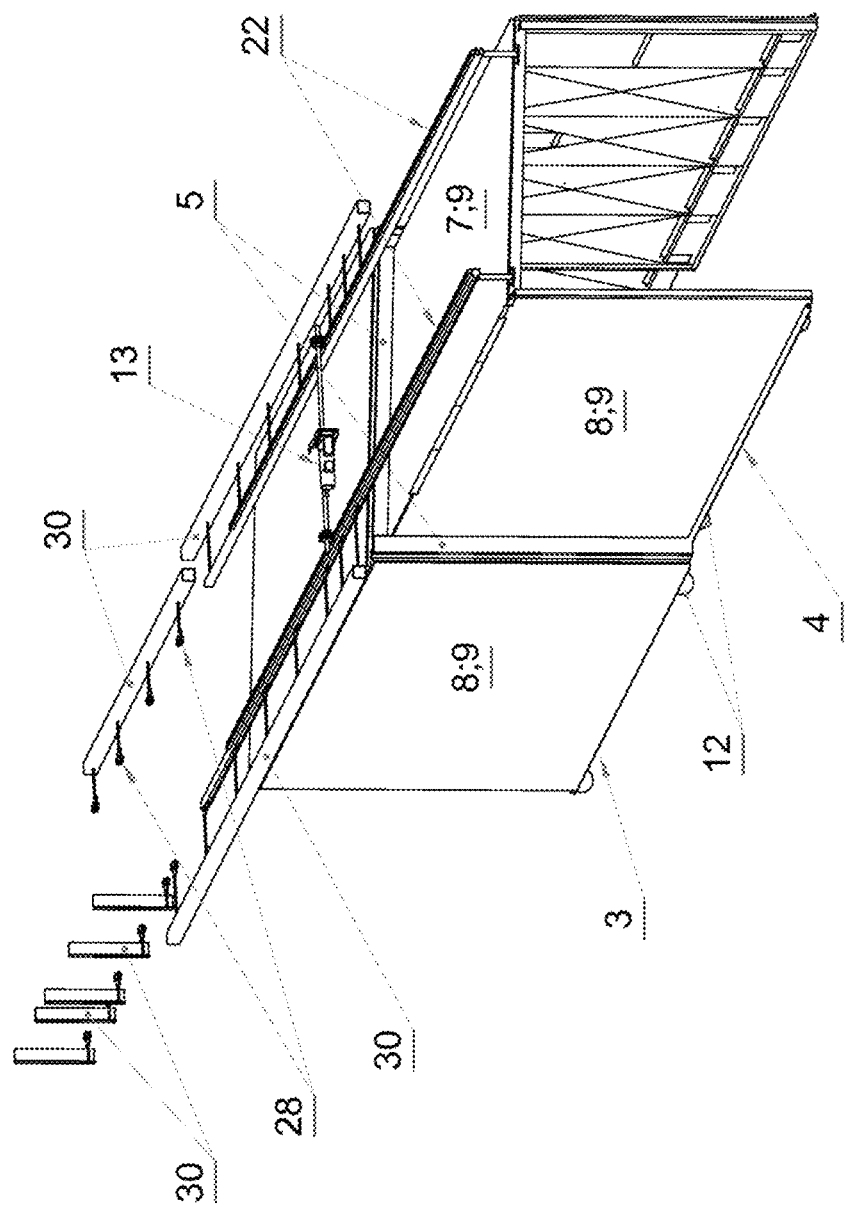
Figure 12:
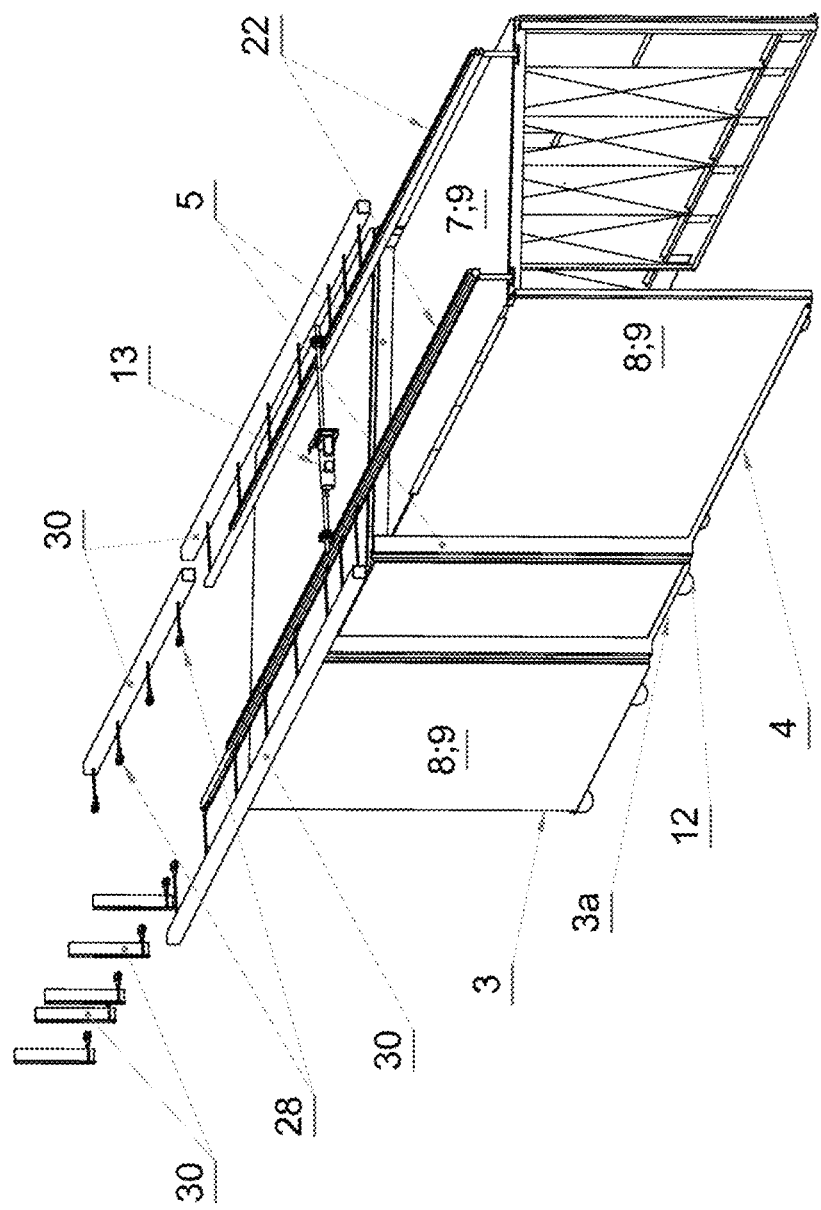
Figure 13:
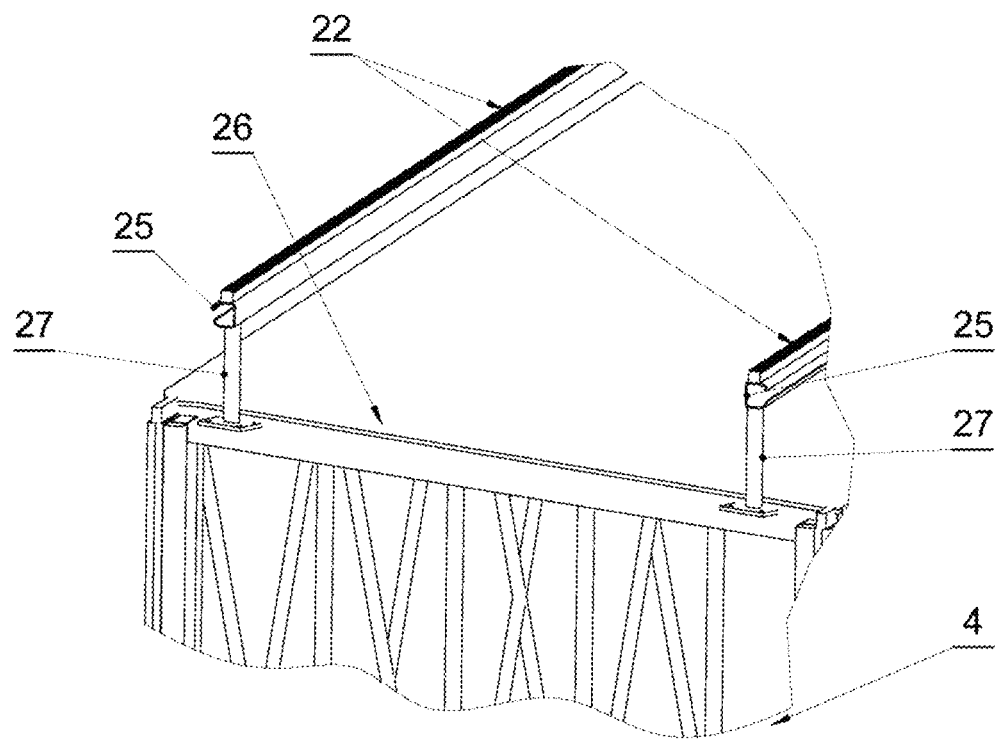
Figure 14:
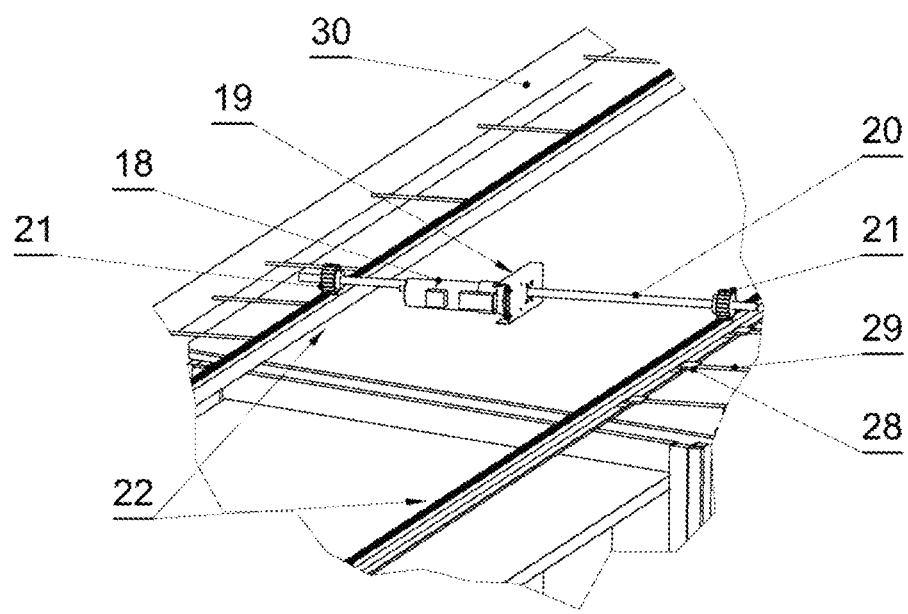
Figure 15:
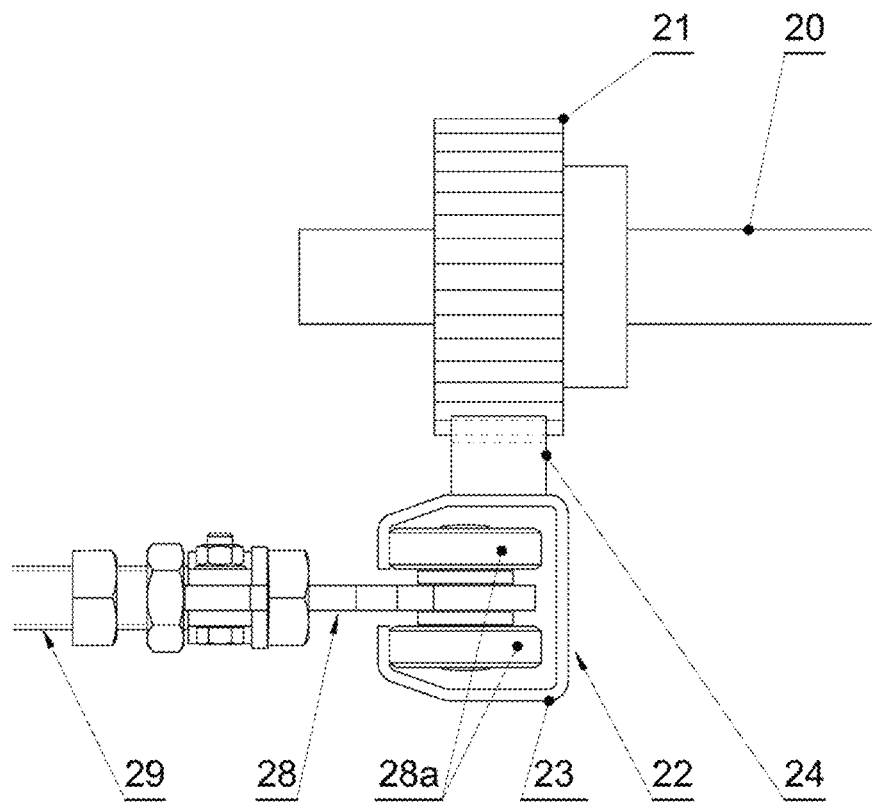
Figure 16:
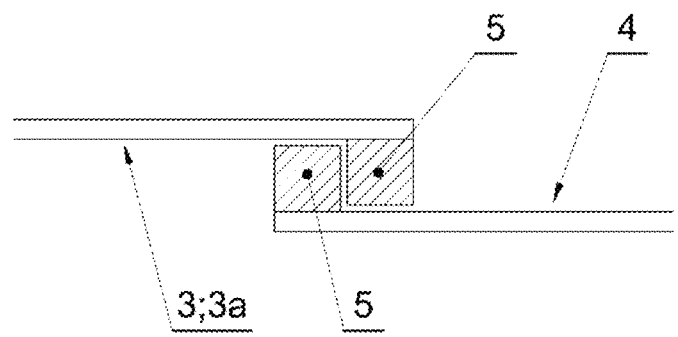
Figure 17:
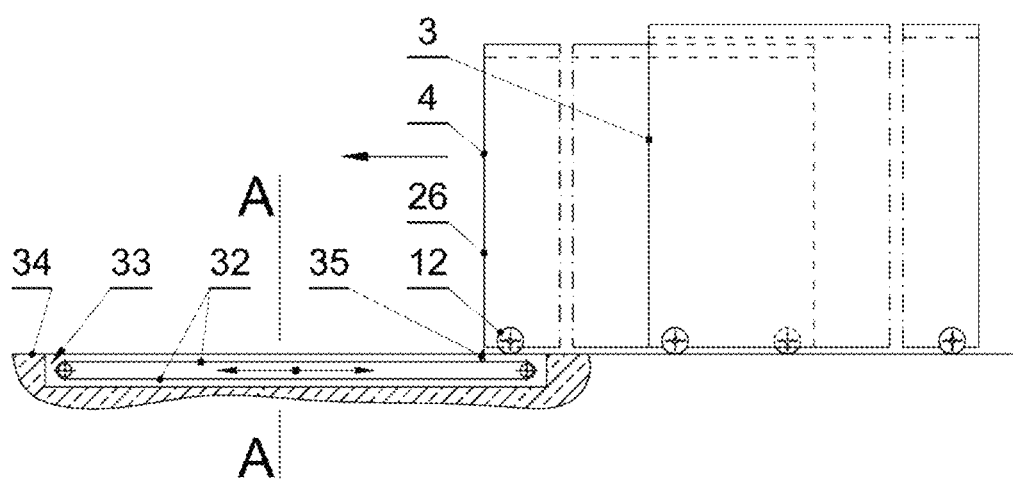
Figure 18:
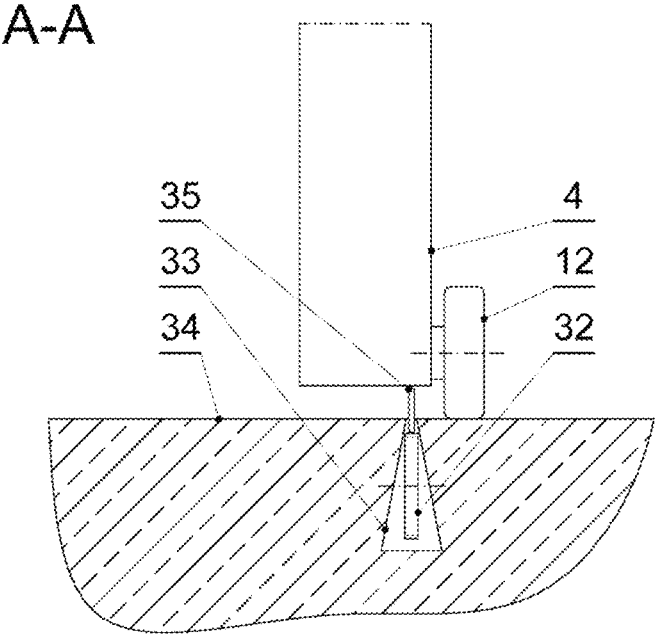
Figure 19:
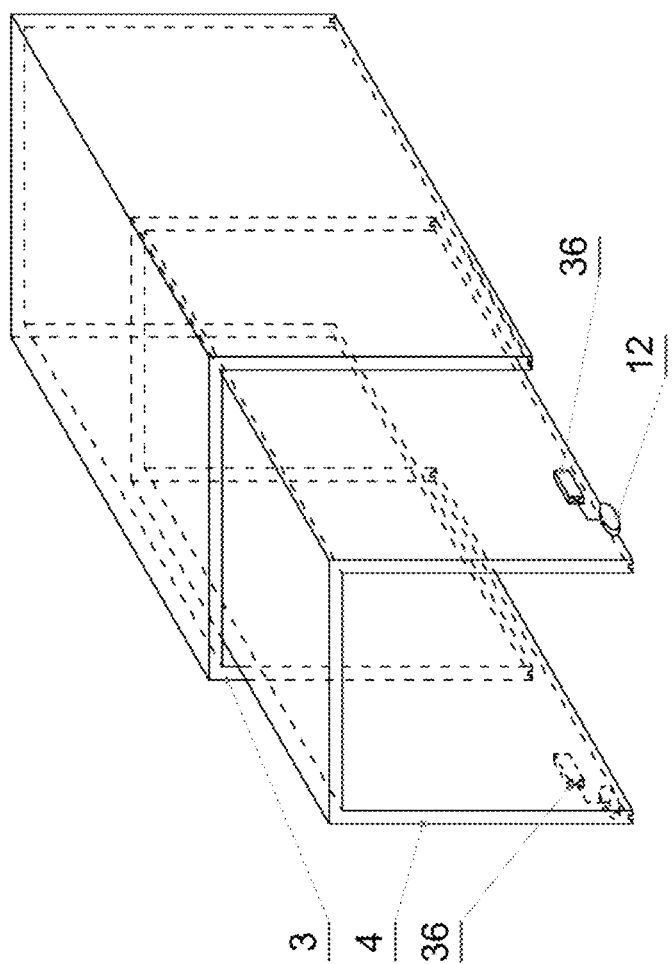

The object of the invention is visualised in the exemplary embodiment on the drawing where FIG. 1 presents a vertical longitudinal section of a two-segment emergency escape tunnel in the resting position, FIG. 2—a vertical cross section of the tunnel according to FIG. 1, FIG. 3—a vertical longitudinal section of the internal segment, FIG. 4—a vertical cross section of the internal segment, FIG. 5—a top view of the internal segment, FIG. 6—a vertical longitudinal section of the external segment, FIG. 7—a vertical cross section of the external segment, FIG. 8—a top view of the external segment, FIG. 9—a horizontal longitudinal section of the two-segment tunnel in the resting position, FIG. 10—a horizontal longitudinal section of this tunnel in the operating position, FIG. 11—a perspective view of an extended two-segment tunnel, FIG. 12—a perspective view of an extended three-segment tunnel, FIG. 13—a perspective view of the front part of the tunnel in the resting position, FIG. 14—a perspective view of the drive of the tunnel, FIG. 15—a cross section of a rail with a roller support, FIG. 16—a cross section of interlocked retaining flanges, FIG. 17—a longitudinal section of a tunnel with a drive cable, FIG. 18—an enlarged cross section of the tie drive cable, and FIG. 19—a perspective view of a tunnel with individual drives of traction wheels.

The escape tunnel is formed in a multi-storey building with a centrally situated staircase 1 and an external wall 2 situated approximately 15 m away from it, the staircase 1 of the building being surrounded by useable rooms not shown on the drawing. In the solution presented on FIG. 1, 2, 9, 10, 11, the tunnel consists of two telescopically overlapping segments 3 and 4, the ends of which are interlocked with their retaining flanges 5. In cases where the distance between the staircase 1 and the external wall 2 of the building is relatively small, the internal segment 4 alone can serve as the tunnel. If this distance definitely exceeds 15 m, then, according to FIG. 12, a three-segment tunnel is employed in which between the external segment 3 and the internal segment 4 an intermediate segment 3*a* is provided. In such a tunnel, the ends of adjacent segments 3, 3*a* and 3*a*, 4 are interlocked with their retaining flange 5. Each segment 3, 3*a*, 4 of the tunnel has a load-bearing skeleton 6 with an outline similar in the shape to an upturned letter U which is built of steel section bars of a rectangular shape. The top wall 7 and the side walls 8 of the tunnel are covered on the outside with layers 9 of a fire-resistant material providing the tunnel with the required fire resistance. In turn, the skeleton 6 of each segment 3, 3a, 4 is built of lateral spaced frames 10 with an outline similar in shape to an upturned letter U. The adjacent frames 10 are permanently interconnected by means of slanted strut 11. There are traction wheels 12 set on the lower edges of the skeleton 6 of each of the segments 3, 3a, 4. The tunnel has a self-acting drive system 13 and it is horizontally shiftable in the space 14 formed between the staircase 1 and the external wall 2 of the building. In the resting position of the tunnel, the segments 3, 3a, 4 set one on another are situated within the staircase 1. In the operating position, the outlet piece 15 of the internal segment 4 of the tunnel is situated within the open exit door 16 of the building, the exit 17 of this segment of the tunnel being situated on the outside of the building. The drive system 13 is provided within the staircase 1 and consists of a motor 18 and a transmission 19 with a two-part drive shaft 20 ended with a couple of toothed wheels 21. Over the segments 3, 3a, 4 of the tunnel there are horizontally spread two parallel and longitudinally sliding rails 22. Each of the rails consists of C-profile guide 23 and a drive toothed bar 24 inseparably connected to it. The front ends 25 of the sliding rails 22 are fixed to the front edge 26 of the internal segment 4 of the tunnel by means of vertical supports 27. Inside the C-profile guide 23 there are immovably provided roller supports 28, mounted on the ends of the horizontal booms 29, which are fixed by means of steel support 30 to the walls of the staircase 1. The roller supports 28 are provided with turning rolls 28a on which the sliding rails 22 rest. The toothed bars 24 of the sliding rails 22 mesh with the toothed wheels 21 of the drive system 13. The rear sections of the sliding rails 22 are surrounded by the tubular shields 31 made of a fire-resistant material, particularly of gypsum boards, which are mounted on roller supports 28. The tunnel according to the invention can also be equipped with different drive systems which do not require to be engaged with the toothed bars 24 of the sliding rails 22. One of the drive systems, presented on FIGS. 17 and 18, has a form of a flexible drive cable 32 without an end which is immersed in the channel 33 formed in the floor 34 of the building and spread parallel to the sliding rails 22 having no toothed bars 24. The upper section of the tie rod 32 is connected pointwise to the front edge 26 of the internal segment 4 by means of the transversal hook 35. Most preferably, the drive cable 32 has a form of a driving chain whereas the cross section of the channel 33 is narrowed upwards so that the floor 34 has safe surface. In the solution according to FIG. 19, the drive system is a set of individual drives 36 which are coupled separately to the traction wheels 12 of the internal segment 4. Each individual drive 36 has its own electric motor, not shown on the drawing, which is powered by the current from the grid by means of a retractable cable. This motor can also be powered from not shown batteries situated in the internal segment 4 of the tunnel. In another solution, not shown on the drawing, the particular traction wheels 12 of the segment 4 are coupled through chain transmissions to a common drive motor which is situated on the internal segment 4. If the smoke detectors not shown on the drawing detect fire hazard within the building, then the signals emitted from them will cause the motor 18 in the drive system 13 to self-activate. While rotating, the toothed wheels 21 through the toothed bars 24 cause a longitudinal shift of the sliding rails 22 and of the related internal segment 4 which extends from the external segment 3 or the intermediate segment 3a and moves towards the wall 2 of the building. During this movement, the retaining flange 5 of the internal segment 4 gets tightly interlocked with the retaining flange 5 of the intermediate segment 3a or the external segment 3, pulling it behind itself towards the building wall 2, the segments 3 and 4 or 3, 3a, 4 of the tunnel rolling on the floor 34 on their traction wheels 12. In the final phase of the movement of the segments 3 and 4 or 3, 3a, 4, the door 16 in the external wall 2 opens in the self-activation manner. The outlet piece 15 of the internal segment 4 is introduced within the open door 16 deeply enough to make the exit 17 of on the outside of the building. After the self-deactivation of the drive system, the rear section of the external segment 3 remains partly immersed in the staircase 1. While being immobilised in such positions, the segments 3 and 4 or 3, 3a, 4 of the tunnel make it possible to safely cross the open space 14 of the building and evacuate people from the fire hazard zone.

MARKINGS

1—staircase
2—building wall
3—external segment
3a—intermediate segment
4—internal segment
5—retaining flange
6—skeleton
7—top wall
8—side wall
9—material layer
10—skeleton frame
11—slanted strut
12—traction wheel
13—drive system
14—building space
15—outlet piece
16—building door
17—exit
18—motor
19—transmission
20—drive shaft
21—toothed wheel
22—sliding rail
23—C-profile guide
24—toothed bar
25—front end
26—front edge
27—vertical support
28—roller support
28a—roll
29—boom
30—support
31—tubular shield
32—drive cable
33—channel
34—floor
35—hook
36—individual drive

The invention claimed is:

1. An escape tunnel in a building with a centrally situated staircase (1) in the building, the escape tunnel comprising:
    at least two telescopically overlapping segments (3, 4), each of which is equipped with a load-bearing skeleton having an inverted U-shape,
    wherein a top wall and side walls of the load-bearing skeleton are covered on an outside with layers of a fire-resistant material; and a self-acting drive system (13, 32, 36) that is horizontally shiftable in space (14) between the centrally situated staircase (1) and an external wall (2) of the building, wherein the escape tunnel is located in a resting position inside the centrally situated staircase (1), and wherein, in an operating position of the escape tunnel, an outlet piece (15) is situated within an open exit door (16) of the building while an exit (17) of the tunnel is situated on an outside of the building.

2. The escape tunnel according to claim 1, wherein adjacent ends of the at least two telescopically overlapping segments (3, 4) are interlocked with retaining flanges (5).

3. The escape tunnel according to claim 2, wherein the load-bearing skeleton (6) of each telescopically overlapping segment (3, 3a, 4) is built of lateral spaced frames (10) with an outline similar to a letter U, adjacent lateral spaced frames (10) being permanently interconnected by means of slanted struts (11) and, on lower edges of the load-bearing skeleton (6), being provided traction wheels (12).

4. The escape tunnel according to claim 1, further comprising:
at least three telescopically overlapping segments (3, 3a, 4),
wherein ends of adjacent telescopically overlapping segments are interlocked with retaining flanges (5).

5. The escape tunnel according to claim 1,
wherein the at least two telescopically overlapping segments (3, 3a, 4) comprise two horizontally spread, parallel, and longitudinally sliding rails (22), each sliding rail comprising a C-profile guide (23) and an inseparably connected a drive toothed bar (24), wherein front endings (25) of the sliding rails (22) are fixed to a front edge (26) of a telescopically overlapping segment (4), there being permanent roller supports (28) provided inside the sliding rails (23) and fixed to the walls of the centrally situated staircase (1), whereas toothed bars (24) of the sliding rails (22) mesh with toothed wheels (21) of the self-acting drive system (13) which is placed within the centrally situated staircase (1).

6. The escape tunnel according to claim 5, wherein rear sections of the sliding rails (22) are surrounded by tubular shields (31) made of a fire-resistant material and are mounted on fixed roller supports (28).

7. The escape tunnel according to claim 1, wherein the self-acting drive system comprises a flexible drive cable (32) without an end which is immersed in a channel (33) formed in a floor (34) of the building and spread parallel to the sliding rails (22) with C-profile guides (23), wherein an upper section of the flexible drive cable (32) is connected pointwise to a front edge (26) of an internal segment (4) of the escape tunnel by means of a transversal hook (35).

8. The escape tunnel according to claim 7, wherein the flexible drive cable (32) has a form of a driving chain whereas a cross-section of the channel (33) is narrowed upwards.

9. The escape tunnel according to claim 1, wherein the self-acting drive system comprises a set of individual drives (36) which are coupled to traction wheels (12) of an internal segment (4).

\* \* \* \* \*